United States Patent
Kay et al.

(10) Patent No.: US 8,073,122 B2
(45) Date of Patent: Dec. 6, 2011

(54) MESSAGE RECALL USING DIGITAL RIGHTS MANAGEMENT

(75) Inventors: Jeffrey B. Kay, Bellevue, WA (US); Frank D. Byrum, Seattle, WA (US); Steven Michael Clagg, Seattle, WA (US); Sara L. Manning, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1194 days.

(21) Appl. No.: 11/765,553

(22) Filed: Jun. 20, 2007

(65) Prior Publication Data

US 2008/0317228 A1 Dec. 25, 2008

(51) Int. Cl.
*H04M 3/42* (2006.01)
*G06F 15/16* (2006.01)

(52) U.S. Cl. .............. 379/201.01; 379/88.08; 705/28; 705/303; 709/203; 709/206; 709/242; 713/168; 715/210

(58) Field of Classification Search ........... 379/88.08, 379/201.01; 705/1, 26, 28, 303; 707/1; 709/203, 709/206, 242; 713/168; 715/210
See application file for complete search history.

(56) References Cited

U.S. PATENT DOCUMENTS

| | | | | |
|---|---|---|---|---|
| 5,870,548 A | | 2/1999 | Nielsen | 395/200.36 |
| 5,878,230 A | | 3/1999 | Weber et al. | 395/200.68 |
| 5,958,005 A | | 9/1999 | Thorne et al. | 709/202 |
| 6,721,784 B1 | | 4/2004 | Leonard et al. | 709/206 |
| 6,757,713 B1 | | 6/2004 | Ogilvie et al. | 709/206 |
| 7,130,887 B2 | | 10/2006 | Goldberg | 709/206 |
| 7,774,411 B2 | * | 8/2010 | LeMay et al. | 709/206 |
| 2002/0040325 A1 | * | 4/2002 | Takae et al. | 705/26 |
| 2003/0086438 A1 | | 5/2003 | Laumen et al. | 370/462 |
| 2004/0068418 A1 | * | 4/2004 | J'maev | 705/1 |
| 2004/0068484 A1 | * | 4/2004 | J'maev | 707/1 |
| 2004/0093428 A1 | * | 5/2004 | Arnold et al. | 709/242 |
| 2004/0148356 A1 | * | 7/2004 | Bishop et al. | 709/206 |
| 2004/0186884 A1 | | 9/2004 | Dutordoir | 709/206 |
| 2006/0010209 A1 | * | 1/2006 | Hodgson | 709/206 |
| 2006/0080278 A1 | * | 4/2006 | Neiditsch et al. | 707/1 |
| 2006/0184635 A1 | * | 8/2006 | Owen et al. | 709/206 |
| 2007/0124368 A1 | * | 5/2007 | Weiser et al. | 709/203 |
| 2007/0213997 A1 | * | 9/2007 | J'maev et al. | 705/1 |
| 2007/0263789 A1 | * | 11/2007 | Palazzo | 379/67.1 |
| 2008/0313285 A1 | * | 12/2008 | Costea | 709/206 |
| 2008/0317228 A1 | * | 12/2008 | Kay et al. | 379/201.01 |
| 2010/0217979 A1 | * | 8/2010 | Yaghmour | 713/168 |

OTHER PUBLICATIONS

Fetch Retriever, "Instantly Unsend Email in Lotus Notes. Recall Email that was sent in Error or Anger", 2007, http://www.metalogic-inc.com/retriever, 1 page.
"Authentica Secure Mail", DRM, Information Security & Secure Email Encryption Software, 2004, http://www.authentica.com/products/securemail.aspx, 2 pages.
Rubin, A.D. et al., "Revocation of Unread E-Mail in an Untrusted Network", http://snafp.mit.edu/~fubob/pubs/email.ps,gz, 22 pages.
Walter, M., "Authentica, Alchmedia Apply DRM to Corporate Intellectual Property", *The Seybold Report*, Sep. 17, 2001, http://www.authentica.com/images/news/media_coverage/seyboldrpt.pdf, 1(12), 4 pages.

* cited by examiner

*Primary Examiner* — Gerald Gauthier
(74) *Attorney, Agent, or Firm* — Woodcock Washburn LLP

(57) ABSTRACT

Email messages are recalled in accordance with restrictions attached to the message. Use of the message is limited per the restrictions. Example restrictions include printing restrictions, forwarding restrictions, exporting restrictions, copying restrictions, reading restrictions, and a expiration time of the message.

20 Claims, 3 Drawing Sheets

MESSAGE RECALL USING DIGITAL RIGHTS MANAGEMENT

TECHNICAL FIELD

The technical field relates generally to computer processing and more specifically to recalling email messages.

BACKGROUND

There is no consensus among current email systems as how to handle a recalled message that has already been read by a recipient. To implement recall, typical e-mail systems forward a message to an intended recipient indicating the message recall. If the recipient has already read the message, in many cases, the message is removed from the recipient's inbox without the recipient's involvement. This can be of great annoyance to the recipient. Alternatively, if the message has already been opened, the message may not be removed.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

Digital rights management (DRM) is utilized to implement message recall. A request to recall a particular message is sent to a given set of intended recipients. In an example configuration the message recall notification is sent as an e-mail containing the information necessary to identify the recalled message. This recall e-mail is received by a recipient and either the e-mail client or the e-mail message store processes the recall notification. In this configuration, the recalled message in the recipient's inbox is removed and replaced with a version that is wrapped with DRM policy restrictions. Example restrictions include restrictions placed on forwarding the message, restrictions placed on printing the message, restrictions placed on copying the message, restrictions placed on exporting the message, restrictions placed on reading the message, an expiration time, or a combination thereof. This enables message recall to acknowledge that the recipient did receive the message and prevent the message from being retransmitted.

BRIEF DESCRIPTION OF THE DRAWINGS

The foregoing summary, as well as the following detailed description, is better understood when read in conjunction with the appended drawings. For the purpose of illustrating message recall using digital rights management, there is shown in the drawings exemplary constructions thereof; however, message recall using digital rights management is not limited to the specific methods and instrumentalities disclosed.

DETAILED DESCRIPTION OF ILLUSTRATIVE EMBODIMENTS

Digital right management (DRM) rights and restrictions are utilized to implement message recall. Messages can include any type of message such as message transmitted via a network (e.g., the Internet), email messages, or the like. Message recall using digital rights management is described herein as an application recalling email messages. It is to be understood however, that message recall using digital rights management is applicable to recalling any appropriate type of message.

Figure 1:
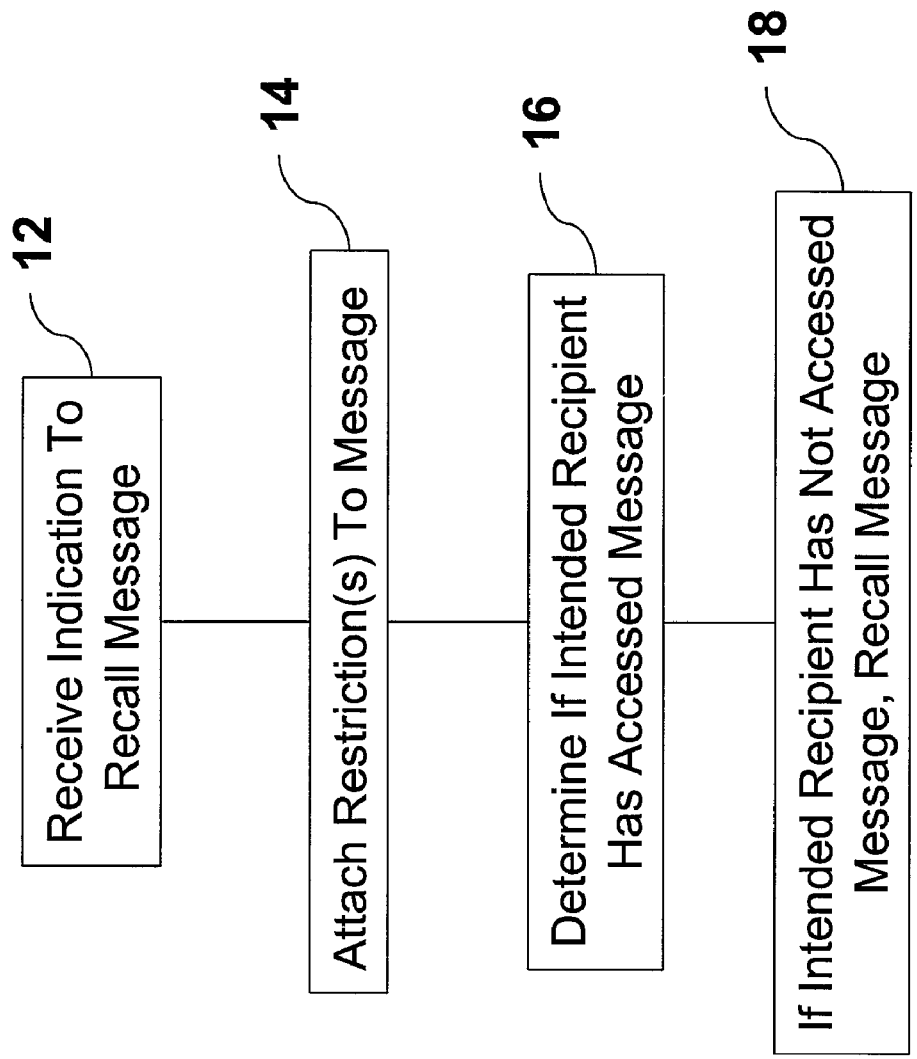
FIG. 1 is a flow diagram of an example process for recalling a message utilizing digital rights management.

FIG. 1 is a flow diagram of an example process for recalling a message utilizing digital rights management. At step 12 an indication to recall a message is received. In an example embodiment, the indication comprises an email containing information needed to recall the message. In response to receiving the indication to recall the message, at step 14, at least one restriction is attached to the message. In an example embodiment, restrictions are in accordance with digital rights management policy restrictions. That is, the recalled message is usable in accordance with policies, licenses, rights, privileges, permissions, or the like, that are available via digital rights management schemes. In an example embodiment, the message being recalled is wrapped with the restriction(s). Thus, the restriction(s) are attached to the message to be recalled and the message can be used only in accordance to the attached restriction(s). Any appropriate restriction can be attached to the message. For example, printing of the message can be prevented or limited, copying of the message can be prevented or limited, reading of the message can be prevented or limited, forwarding of the message can be prevented or limited, exporting of the message can be prevented or limited, the message can be deleted after an expiration time elapses, or a combination thereof. The message being recalled can have recipient specific restrictions attached. For example, one user could be permitted to only read the message, and another recipient could be prevented from reading the message. Thus, a recipient specific restriction is a restriction attached to the message for a specific recipient. A recipient specific restriction can be tailored for respective recipients, a recipient specific restriction can be the same for multiple recipients, or a combination thereof.

At step 16, it is determined if the message to be recalled has been accessed by an intended recipient. The email can be received by any appropriate entity, such as an email server, a mail user agent (MUA), a network server, a general purpose processor, a laptop computer, or the like, for example. If it is determined (step 16) that the message has not been accessed by an intended recipient, the message is recalled, at step 18, for the intended recipient. The message can be recalled in any appropriate manner. For example, the message can be deleted from storage.

Figure 2:
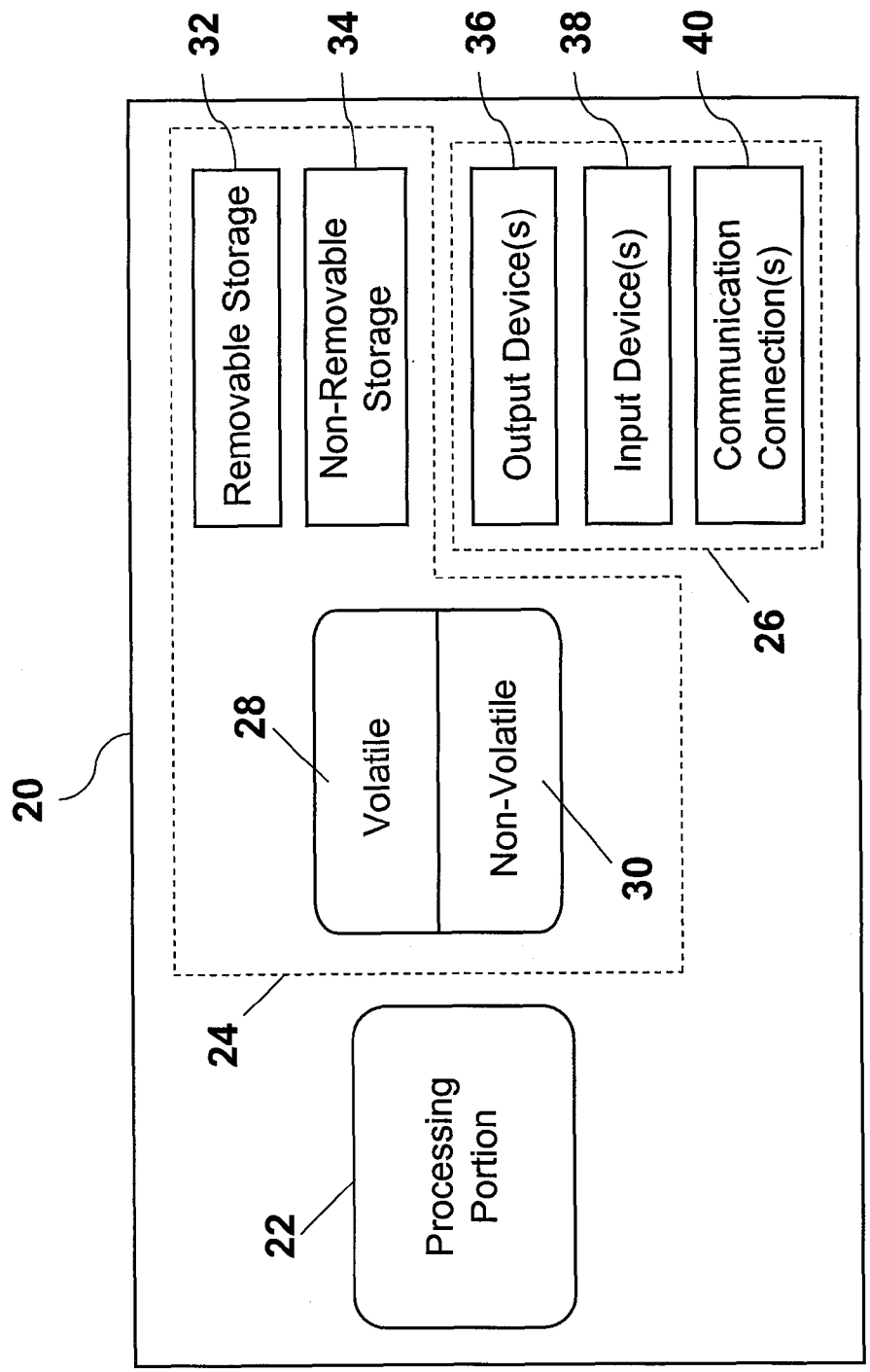
FIG. 2 is a diagram of an exemplary processor for recalling a message using digital rights management.

FIG. 2 is a diagram of an exemplary processor 20 for recalling a message using digital rights management. The processor 20 comprises a processing portion 22, a memory portion 24, and an input/output portion 26. The processing portion 22, memory portion 24, and input/output portion 26 are coupled together (coupling not shown in FIG. 2) to allow communications therebetween. The input/output portion 26 is capable of providing and/or receiving components utilized to recalling a message using digital rights management. as described above. For example, the input/output portion 26 is capable of, as described above, receiving an indication of message recall and providing an indication of message recall.

The processing portion 22 is capable of recalling a message using digital rights management, as described above. For example, the processing portion 22 is capable of recalling a message, attaching a restriction to a message, determining if an intended recipient has accessed a message, or a combination thereof.

The processor 20 can be implemented as a client processor and/or a server processor. In a basic configuration, the processor 20 can include at least one processing portion 22 and memory portion 24. The memory portion 24 can store any information utilized in conjunction with recalling a message using digital rights management, such as a message and a restriction, for example. Depending upon the exact configuration and type of processor, the memory portion 24 can be volatile (such as RAM) 28, non-volatile (such as ROM, flash memory, etc.) 30, or a combination thereof. The processor 20 can have additional features/functionality. For example, the processor 20 can include additional storage (removable storage 32 and/or non-removable storage 34) including, but not limited to, magnetic or optical disks, tape, flash, smart cards or a combination thereof. Computer storage media, such as memory portion 24, 28, 30, 32, and 34, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 20. Any such computer storage media can be part of the processor 20.

The processor 20 can also contain communications connection(s) 40 that allow the processor 20 to communicate with other devices, such as other devices, for example. Communications connection(s) 40 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 20 also can have input device(s) 38 such as keyboard, mouse, pen, voice input device, touch input device, etc. Output device(s) 36 such as a display, speakers, printer, etc. also can be included.

Figure 3:
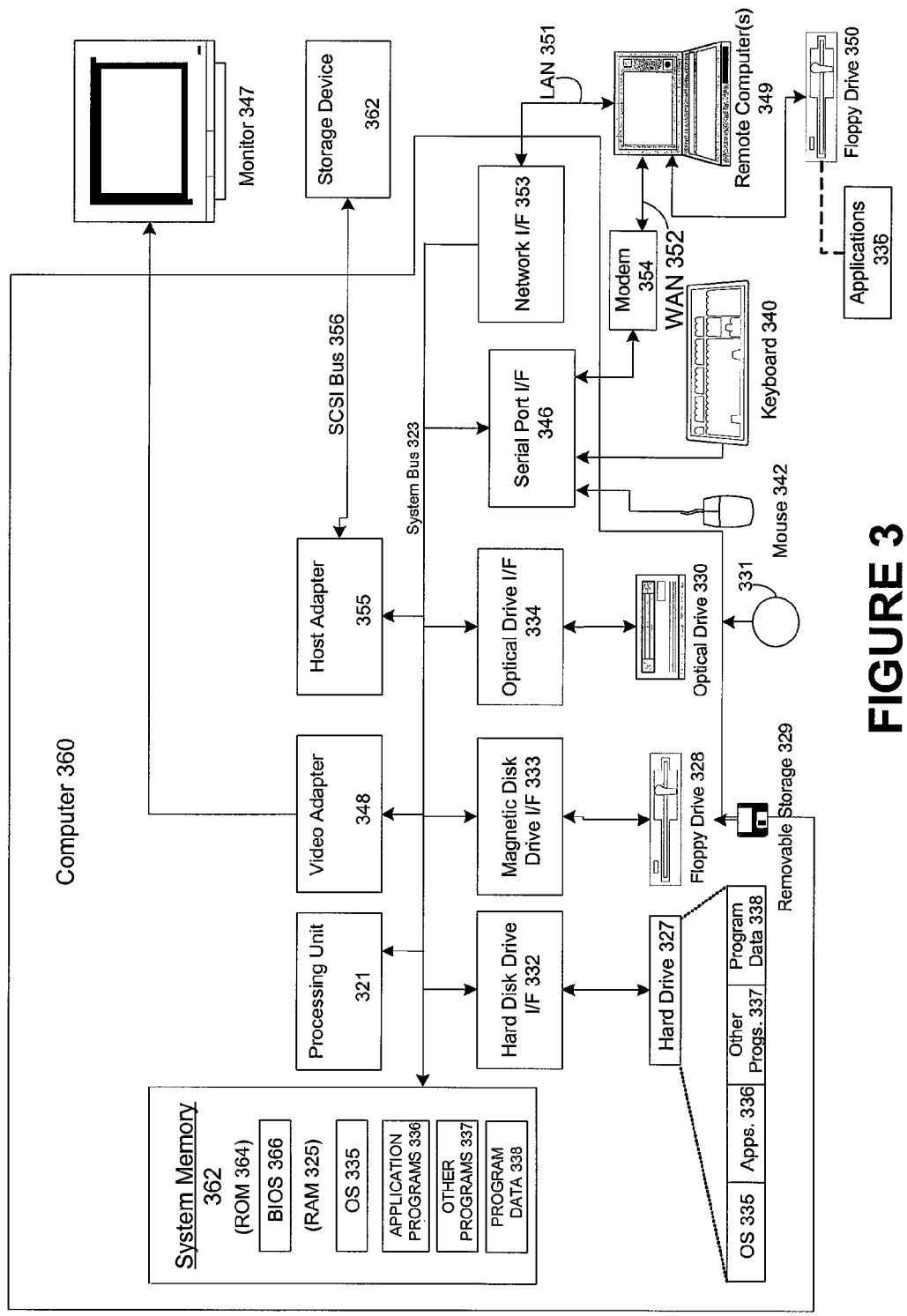
FIG. 3 is a depiction of a suitable computing environment in which recalling a message using digital rights management can be implemented.

FIG. 3 and the following discussion provide a brief general description of a suitable computing environment in which recalling a message using digital rights management can be implemented. Although not required, various aspects of recalling a message using digital rights management can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of recalling a message using digital rights management can be practiced with other computer system configurations, including hand held devices, multi processor systems, microprocessor based or programmable consumer electronics, network PCs, minicomputers, mainframe computers, and the like. Further, recalling a message using digital rights management also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 321, the memory (both ROM 364 and RAM 325), the basic input/output system (BIOS) 366, and various input/output (I/O) devices such as a keyboard 340, a mouse 362, a monitor 347, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with recalling a message using digital rights management as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 3, an exemplary general purpose computing system includes a conventional computing device 360 or the like, including a processing unit 321, a system memory 362, and a system bus 323 that couples various system components including the system memory to the processing unit 321. The system bus 323 may be any of several types of bus structures including a memory bus or memory controller, a peripheral bus, and a local bus using any of a variety of bus architectures. The system memory includes read only memory (ROM) 364 and random access memory (RAM) 325. A basic input/output system 366 (BIOS), containing basic routines that help to transfer information between elements within the computing device 360, such as during start up, is stored in ROM 364. The computing device 360 may further include a hard disk drive 327 for reading from and writing to a hard disk (hard disk not shown), a magnetic disk drive 328 (e.g., floppy drive) for reading from or writing to a removable magnetic disk 329 (e.g., floppy disk, removal storage), and an optical disk drive 330 for reading from or writing to a removable optical disk 331 such as a CD ROM or other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer readable media provide non volatile storage of computer readable instructions, data structures, program modules and other data for the computing device 360. Although the exemplary environment described herein employs a hard disk, a removable magnetic disk 329, and a removable optical disk 331, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 329, optical disk 331, ROM 364, or RAM 325, including an operating system 335, one or more application programs 336, other program modules 337, and program data 338. A user may enter commands and information into the computing device 360 through input devices such as a keyboard 340 and pointing device 362 (e.g., mouse). Other input devices (not shown) may include a microphone, joystick, game pad, satellite disk, scanner, or the like. These and other input devices are often connected to the processing unit 321 through a serial port interface 346 that is coupled to the system bus, but may be connected by other interfaces, such as a parallel port, game port, or universal serial bus (USB). A monitor 347 or other type of display device is also connected to the system bus 323 via an interface, such as a video adapter 348. In addition to the monitor 347, computing devices typically include other peripheral output devices (not shown), such as speakers and printers. The exemplary environment of FIG. 3 also includes a host adapter 355, Small Computer System Interface (SCSI) bus 356, and an external storage device 362 connected to the SCSI bus 356.

The computing device 360 may operate in a networked environment using logical connections to one or more remote computers, such as a remote computer 349. The remote computer 349 may be another computing device (e.g., personal computer), a server, a router, a network PC, a peer device, or other common network node, and typically includes many or all of the elements described above relative to the computing device 360, although only a memory storage device 350 (floppy drive) has been illustrated in FIG. 3. The logical connections depicted in FIG. 3 include a local area network (LAN) 351 and a wide area network (WAN) 352. Such networking environments are commonplace in offices, enterprise wide computer networks, intranets and the Internet.

When used in a LAN networking environment, the computing device 360 is connected to the LAN 351 through a network interface or adapter 353. When used in a WAN networking environment, the computing device 360 can include a modem 354 or other means for establishing communications over the wide area network 352, such as the Internet. The modem 354, which may be internal or external, is connected to the system bus 323 via the serial port interface 346. In a networked environment, program modules depicted relative to the computing device 360, or portions thereof, may be stored in the remote memory storage device. It will be appreciated that the network connections shown are exemplary and other means of establishing a communications link between the computers may be used.

While it is envisioned that numerous embodiments of recalling a message using digital rights management are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for recalling a message using digital rights management, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing recalling a message using digital rights management.

The program(s) can be implemented in assembly or machine language, if desired. In any case, the language can be a compiled or interpreted language, and combined with hardware implementations. The methods and apparatuses for implementing recalling a message using digital rights management also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of recalling a message using digital rights management. Additionally, any storage techniques used in connection with recalling a message using digital rights management can invariably be a combination of hardware and software.

While recalling a message using digital rights management has been described in connection with the example embodiments of the various figures, it is to be understood that other similar embodiments can be used or modifications and additions can be made to the described embodiments for performing the same functions of recalling a message using digital rights management without deviating therefrom. Therefore, recalling a message using digital rights management as described herein should not be limited to any single embodiment, but rather should be construed in breadth and scope in accordance with the appended claims.

What is claimed:

1. A computer-implemented method for recalling a message, the method comprising:
   receiving, by the computer, an indication to recall the message;
   responsive to receiving the indication to recall the message, attaching, via the computer, at least one restriction to the message, wherein use of the message is in accordance with the at least one restriction.

2. A method in accordance with claim 1, wherein the message comprises an email message.

3. A method in accordance with claim 1, wherein the at least one restriction prevents printing of the message.

4. A method in accordance with claim 1, wherein the at least one restriction prevents forwarding of the message.

5. A method in accordance with claim 1, wherein the at least one restriction prevents exporting of the message.

6. A method in accordance with claim 1, wherein:
   the at least one restriction comprises an expiration time; and
   if a recipient of the message has accessed the message, the message is deleted upon elapse of the expiration time.

7. A method in accordance with claim 1, wherein the at least one restriction limits at least one of printing of the message, forwarding of the message, exporting of the message, reading the message, and an amount of time the message is stored.

8. A method in accordance with claim 1, wherein prior to recall, the message comprises the at least one restriction, and attaching the at least one restriction comprises activating the at least one restriction.

9. A method in accordance with claim 1, wherein attaching the at least one restriction comprises replacing the message with a copy of the message having the at least one restriction.

10. A method in accordance with claim 1, wherein the at least one restriction is recipient specific.

11. A system for recalling a message, the system comprising:
    an input/output portion configured to receive an indication to recall the message;
    a processing portion configured to:
       responsive to receiving the indication to recall the message, attach at least one restriction to the message, wherein use of the message is in accordance with the at least one restriction; and
    a memory portion configured to store the message and an indication of the at least one restriction.

12. A system in accordance with claim 11, wherein the message comprises an email message.

13. A system in accordance with claim 11, wherein the at least one restriction prevents at least one of printing of the message, forwarding of the message, and exporting the message.

14. A system in accordance with claim 11, wherein the at least one restriction is recipient specific.

15. A system in accordance with claim 11, wherein:
    the at least one restriction comprises an expiration time; and
    if a recipient of the message has accessed the message, the message is deleted upon elapse of the expiration time.

16. A system in accordance with claim 11, wherein the at least one restriction limits at least one of printing of the message, forwarding of the message, exporting of the message, reading the message, and an amount of time the message is stored.

17. A system in accordance with claim 11, wherein prior to recall, the message comprises the at least one restriction, and attaching the at least one restriction comprises activating the at least one restriction.

18. A system in accordance with claim 11, wherein attaching the at least one restriction comprises replacing the message with a copy of the message having the at least one restriction.

19. A computer-readable medium having stored thereon computer-executable instructions for recalling an email message by performing the steps of:
    receiving an indication to recall the email message;
    responsive to receiving the indication to recall the message, attaching at least one restriction to the email message, wherein use of the message is in accordance with the at least one restriction.

20. A computer-readable medium in accordance with claim 19, wherein the at least one restriction comprises at least one of:
    a restriction upon printing of the email message;
    a restriction upon forwarding of the email message;
    a restriction upon exporting of the email message;
    a restriction upon reading of the email message; and
    an expiration time of the email message.

* * * * *